US012286960B2

(12) United States Patent
Neto et al.

(10) Patent No.: US 12,286,960 B2
(45) Date of Patent: Apr. 29, 2025

(54) CONTROL OF A MULTI-ROTOR WIND TURBINE SYSTEM USING LOCAL MPC CONTROLLERS

(71) Applicant: VESTAS WIND SYSTEMS A/S, Aarhus N. (DK)

(72) Inventors: Julio Xavier Vianna Neto, Aarhus N (DK); Jon Sowman, Aarhus N (DK)

(73) Assignee: VESTAS WIND SYSTEMS A/S, Aarhus N (DK)

(*) Notice: Subject to any disclaimer, the term of this patent is extended or adjusted under 35 U.S.C. 154(b) by 372 days.

(21) Appl. No.: 17/856,732

(22) Filed: Jul. 1, 2022

(65) Prior Publication Data
US 2023/0003193 A1    Jan. 5, 2023

(30) Foreign Application Priority Data
Jul. 1, 2021   (DK) .......................... PA 2021 70346

(51) Int. Cl.
*F03D 7/04* (2006.01)
*F03D 1/02* (2006.01)
*F03D 7/02* (2006.01)

(52) U.S. Cl.
CPC .............. *F03D 7/045* (2013.01); *F03D 1/02* (2013.01); *F03D 7/0204* (2013.01); *F05B 2270/326* (2013.01); *F05B 2270/328* (2013.01); *F05B 2270/331* (2013.01); *F05B 2270/404* (2013.01)

(58) Field of Classification Search
CPC .......... F03D 7/045; F03D 1/02; F03D 7/0204; F03D 7/047; F05B 2270/326; F05B 2270/328; F05B 2270/331; F05B 2270/404; F05B 2270/111; Y02E 10/72; G05B 13/048; G05B 2219/2619

USPC .......................................................... 700/287
See application file for complete search history.

(56) References Cited

U.S. PATENT DOCUMENTS

| 2018/0283355 A1 | 10/2018 | Miranda |
| 2020/0291922 A1* | 9/2020 | Hovgaard ............... F03D 7/045 |
| 2021/0047999 A1* | 2/2021 | Gebraad ................. F03D 7/048 |
| 2021/0277868 A1 | 9/2021 | Dalsgaard |

FOREIGN PATENT DOCUMENTS

| CN | 111878309 A | 11/2020 |
| EP | 3274584 A1 | 1/2018 |
| EP | 3728832 A1 | 10/2020 |

(Continued)

OTHER PUBLICATIONS

Danish Patent and Trademark Office, 1st Technical Examination Including The Search Report for Application PA 2021 70346 dated Jan. 28, 2022.

(Continued)

*Primary Examiner* — Thomas C Lee
*Assistant Examiner* — Michael Tang
(74) *Attorney, Agent, or Firm* — Patterson + Sheridan, LLP

(57) ABSTRACT

Control of a multi-rotor wind turbine system. A local controller is arranged for each wind turbine module and implementing a local model predictive control (MPC) routine. A central controller is arranged to determine a set of operational constraints of the wind turbine modules. Based on a current operational state of the wind turbine module and the set of operational constraints, one or more predicted operational trajectories are calculated and used for controlling the wind turbine module.

13 Claims, 5 Drawing Sheets

(56) References Cited

FOREIGN PATENT DOCUMENTS

| | | | |
|---|---|---|---|
| WO | 2016128002 A1 | 8/2016 | |
| WO | 2016128005 A1 | 8/2016 | |
| WO | WO-2016150447 A1 * | 9/2016 | ............... F03D 1/02 |
| WO | 2017084674 A1 | 5/2017 | |
| WO | 2017092762 A1 | 6/2017 | |
| WO | 2017174089 A1 | 10/2017 | |
| WO | WO-2017202944 A1 * | 11/2017 | ............... F03D 1/02 |
| WO | 2019110063 A1 | 6/2019 | |
| WO | 2019114896 A1 | 6/2019 | |
| WO | WO-2019120419 A1 * | 6/2019 | ............... F03D 1/02 |
| WO | WO-2020011322 A1 * | 1/2020 | ............... F03D 1/02 |

OTHER PUBLICATIONS

European Patent Office, European Search Report for European Patent Application No. 22179416.7-1002, dated Nov. 23, 2022.

* cited by examiner

CONTROL OF A MULTI-ROTOR WIND TURBINE SYSTEM USING LOCAL MPC CONTROLLERS

FIELD OF THE INVENTION

The present invention relates to control of a multi-rotor wind turbine system. In particular, the invention is directed to a system using local controllers for operation of the respective ones of the wind turbine modules using model predictive control (MPC) together with a central controller.

BACKGROUND OF THE INVENTION

There exist a number of wind turbine types or designs. A common type of wind turbine is the three-bladed upwind horizontal-axis wind turbine (HAWT), in which the turbine rotor is at the front of the nacelle and facing the wind upstream of its supporting turbine tower. Another type is the multi-rotor array type wind turbine, where a plurality of wind turbine modules are mounted to a common support structure.

EP3274584 discloses a multi-rotor wind turbine in which a plurality of wind turbine modules are mounted to a common support structure. In general, a multi-rotor wind turbine may achieve the economy of scale that can be obtained with a very large single rotor turbine, but has the potential to avoid the associated drawbacks such as high blade mass, scaled up power electronic components and so on.

Nevertheless, although multi-rotor wind turbine has its advantages, it presents challenges to implement the concept in practice, particularly in how to control the multiple rotors in a robust and simple manner. EP3274584 approaches the control strategy using a control system for a multi-rotor wind turbine system which comprises local controllers operable to control the wind turbine modules in accordance with local control objectives and a central controller configured to monitor the operation of the wind turbine system and based thereon calculate the local control objectives. The central controller is implemented as a model predictive controller (MPC).

It is against this background that the invention has been devised.

SUMMARY OF THE INVENTION

It would be advantageous to control a wind turbine multi-rotor system in a manner where local controllers of the wind turbine modules can operate with different wind turbine systems, in particular it would be advantageous to provide a control system for a multi-rotor wind turbine system which is robust to using local controllers which is arranged for either operation of a single rotor turbine or operation of a wind turbine module in a multi-rotor turbine, and where the control system of the wind turbine modules can be used for different support structure constructions in a simple manner.

Accordingly, in a first aspect, there is provided a control system for a wind turbine system comprising two or more wind turbine modules mounted to a common support structure, the control system comprises:
 a local controller arranged for each wind turbine modules, and implementing a local model predictive control (MPC) routine;
 a central controller being in communicative connection with each local controller, the central controller being arranged to determine a set of operational constraints of the wind turbine modules;
 wherein the local MPC routine being arranged for receiving a current operational state of the wind turbine module and based on the current operational state and the set of operational constraints, calculate one or more predicted operational trajectories, the one or more predicted operational trajectories include a predicted control trajectory, where a trajectory comprises a time series of at least one variable;
 controlling the wind turbine module using the control trajectory.

The present invention relates to control of a wind turbine system comprising two or more wind turbine modules mounted to a common support structure. The system may also be referred to as a multi-rotor wind turbine system, multi-rotor wind power system or simply as a multi-rotor wind turbine.

In the present invention, the operation of the wind turbine system is based on local controllers arranged for each wind turbine modules, and each implementing a local model predictive control (MPC) routine.

Advantageously, the system of the invention enables the individual wind turbine modules to optimise their own performance based on the current operational state of the wind turbine module and the set of operational constraints. Utilizing the current operational state of the wind turbine module in the optimization ensures that the MPC routine can be implemented without being dependent on whether the local controller is controlling a single rotor turbine or a wind turbine module of a multi-rotor turbine. For example by utilizing the current operational state of the wind turbine module, the MPC may advantageous be implemented with a cost function which can be utilized irrespectively of the type of wind turbine system. In this manner, the local controller is provided with the responsibility of ensuring optimized control of the wind turbine module to which it is arranged, and the central controller is provided with the responsibility of ensuring that each wind turbine module adhere to safe operation within a structural permissible load envelope.

The set of operational states may be set to ensure the structural integrity of the common support structure. Important constraints include a constraint on one or more of the following: a pitch constraint, a blade load constraint, a rotor thrust constraint, an output power constraint, a rotor speed constraint, a selected component load and/or a selected component load temperature. These constraints are all specific to the wind turbine module and can be tailored to ensure the structural integrity of the common support structure without including terms in the cost function which are specific to a given design of the support structure. This is advantageous since it reduces the amount of adaptation needed for a given local controller to be used with different support structures designs.

Other constraints may be on the tower bending moment. In general constraints may be set for a parameter determined based on sensor signals or set for specific sensor signals.

Constraints on rotor thrust difference between wind turbine modules arranged at the same level, or on rotor thrust difference between sets of wind turbine modules arranged at different levels may also be set in a manner where the constraint itself is not set on a given difference between modules, instead the central controller ensures that constraints are coordinated across different elements of the multi-rotor system.

The set of constraints may comprise hard constraints as well as soft constraints. In addition to setting constraints to influence the control actions, penalties on performing certain control actions may also be included in the cost function. For example, a penalty in the cost function may be imposed on wind turbine module speed in the fore-aft direction. This would favour control actions in the optimization that would dampen the module movement in this direction.

In embodiments, constraints may also be set which would require terms in the cost function specific to the support structures. In an embodiment where the wind turbine modules are mounted on an arm structure extending from a central tower, an important constraint may be on a yaw moment being below a yaw moment limit, the yaw moment being the moment imposed on a yaw system arranged at the common support structure.

Further constraints may include support structure load constraints, such as constraints on the displacement of a given element of the wind turbine system, and arm bending moment constraints, constraints on support structures, such as constrains on support wires e.g. on strain sensor signals.

For a multi-rotor turbine there may be a need for coordinated and synchronized operation. For example, shutdown of a wind turbine module or start-up of a wind turbine module, may beneficially be done synchronous or with a specified timing, to ensure the loads that may be imposed from the un-balanced forces that may arise from such operational state changes are below a certain level. In an embodiment, this may be achieved by arranging the central controller to provide timing commands instructing the local controller to enter an operational state or change an operational state at a time specified in the timing command.

An advantage of the present invention is that the central controller may be a black-box controller being arranged to determine a set of operational constraints of the wind turbine modules. The local controllers of the wind turbine modules may be independent computing entities which communicate with the central controller via a communication interface. The local controllers implement a model predictive control (MPC) routine. The central controller may advantageous be implemented as a control loop feedback controller. A control loop feedback controller may be a PI or PID controller or any other controller of such type. In general, the central controller may be implemented to operate any suitable controller type, including being implemented as a model predictive controller. In addition, or as an alternative the central controller may be implemented as an open loop controller. In open loop control, the central controller may be implemented to set a given constraint, or change a given constraint based on an input signal. For example, if a given operational state is detected, a set of constraints may be set which is adapted to this state. As a concrete example, in a shutdown or start-up operational state, specific thrust constraints may be set which are different from constraints set in a production state.

The central controller may in addition to determining the set of constraints be arranged to control a yaw position of a yaw system arranged at the common support structure, including upwind yaw control where a yaw error is minimized based on a wind direction input.

Model Predictive Control (MPC) is a multivariable control algorithm that uses an optimization cost function over the receding prediction horizon, to calculate the optimal control moves. The model predictive control routine repeatedly calculates the receding horizon trajectory for the wind turbine module. In an embodiment the predicted control actions are inferred from values of the prediction horizon, and the set of operational constraints is determined based on the receding horizon trajectory for the wind turbine module. In this manner, an undesired condition or state may be avoided by adjusting the constraints, and thereby the operation, to a condition which will occur with a high likelihood if no actions are taken.

In an embodiment, the cost function of the model predictive control routine comprises elements directed to isolated operation of the wind turbine module without taking cross-coupling of the operation of another wind turbine module into account. This may be advantageous as the computational requirements to the solver may be reduced.

Model Predictive Control (MPC) is based on optimization of a cost function taking the set of constraints into account. In embodiments, the cost function includes one or more terms directed to the motion of the wind turbine module. In this manner, control actions which would infer large movement or undesired movement of a module can be penalized in the optimization.

In an embodiment the cost function of the local model predictive control routine comprises a structural model for predicting the motion of the wind turbine module of the local controller, the structural model includes a structural model of the wind turbine system taking into account an aerodynamic force applied to the wind turbine module of the local controller without taking into account aerodynamic forces applied to other wind turbine modules of the wind turbine system. In this manner aerodynamic forces imposed on other wind turbine modules may be treated in the structural model as unknown disturbances. This may reduce the computational requirements. In an embodiment, the structural model may be simplified as a single rotor tower designed with the same, or similar, eigenfrequency as the lowest eigenfrequency of the multi-rotor support structure. Such embodiment may roughly encapsulate fore-aft motion of a wind turbine module, and thereby enable structural damping in this direction.

Advantageously, the structural model is defined by a number of pre-determined mode shapes for the movement of the wind turbine system.

The structural model may be arranged for predicting the fore-aft motion of the wind turbine module of the local controller. Fore-aft motion of the wind turbine may be controlled using collective pitch by coordinating rotor thrust changes with the module movement. In an embodiment, the MPC is implemented to control collective pitch and thereby the MPC controller can be utilized also to influence motion in the fore-aft direction.

In an embodiment, the structural model may be arranged for predicting motion in the rotor plane of the wind turbine module of the local controller. Motion in the rotor plane of the wind turbine module may be controlled using individual pitch by coordinating pitch movement to generate an in-plane force. In an embodiment, the MPC is implemented to control individual pitch and thereby the MPC controller can be utilized also to influence the in-plane motion of the wind turbine module. In-plane motion may also be influenced by imposing control actions on the generator power or torque. This aspect may alternatively or additionally be included in the structural model to handle damping of in-plane motion.

In a further aspect, the invention also relates to a multi-rotor wind turbine system. That is the invention relates to a wind turbine system comprising a plurality of wind turbine modules mounted to a common support structure, wherein each of the plurality of wind turbines modules includes a rotor and a power generation system driven by the rotor. The wind turbine system comprises a control system in accordance with the first aspect of the invention.

In an even further aspect, the invention also relates to a method of controlling a multi-rotor wind turbine system in accordance with any one of the other aspects.

In a yet further aspect, the invention also relates to a computer program product comprising software code adapted to control a multi-rotor wind turbine system when executed on a data processing system in accordance with any one of the other aspects.

The computer program product may be provided on a computer readable storage medium or being downloadable from a communication network. The computer program product comprises instructions to cause a data processing system, e.g. in the form of a controller, to carry out the instruction when loaded onto the data processing system.

In general the various embodiments and aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
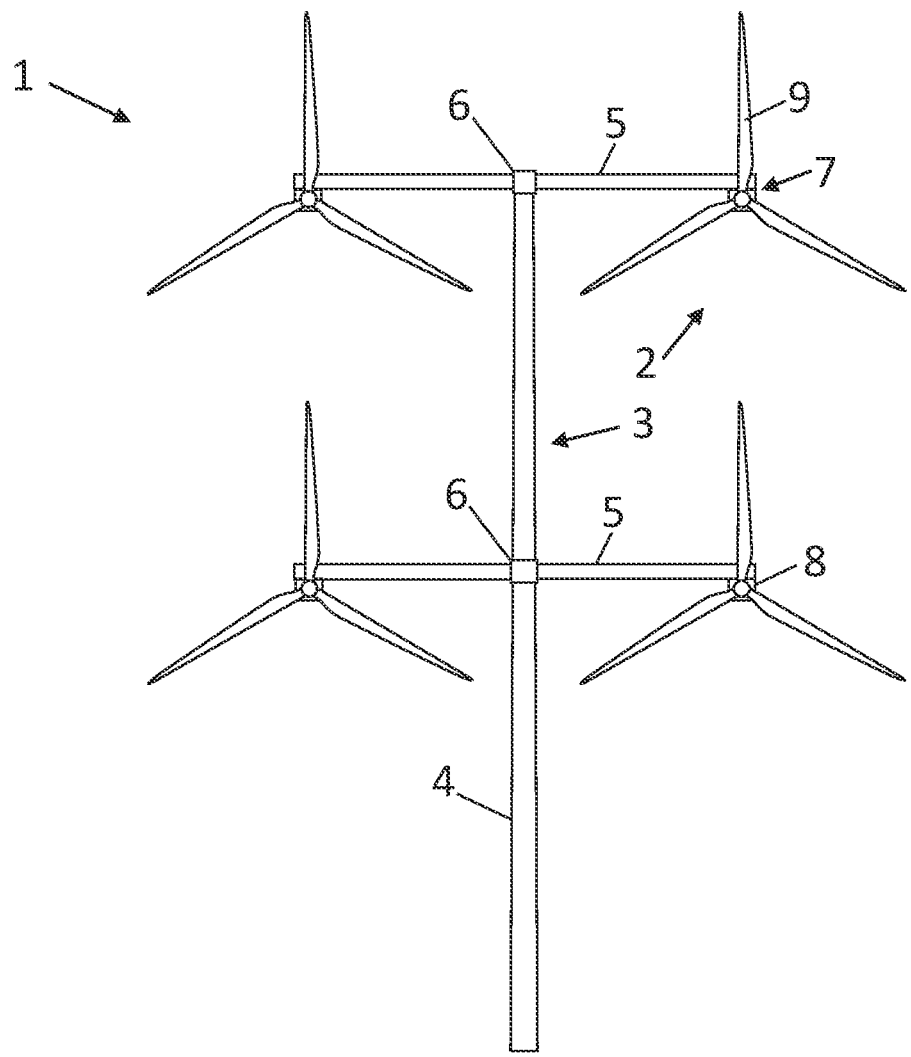
FIG. 1 illustrates an embodiment of a multi-rotor wind turbine system.

FIG. 1 illustrates an embodiment of a multi-rotor wind turbine system 1 comprising a plurality of wind turbine modules 2 mounted to a common support structure 3. Each wind turbine module 2 is a wind turbine generating entity, and may in principle be the generating part of a common single-rotor wind turbine including rotor, generator, converter, etc., while the support structure 3 is a tower 4 comprising a support arm arrangements 5 for holding the wind turbine modules.

Each support arm arrangement 5 is mounted to the tower 4 at a mount portion (here shown together with a central yaw system 6) so that the support arm arrangement is able to rotate about the vertical axis of the tower. The yaw system typically includes a yaw drive capable of rotating the wind turbine modules around the tower. In embodiments, each of the wind turbine modules are fixed to the support arm and rotate/yaw as a pair around the tower, however each wind turbine module may also further comprise a dedicated yaw drive 7 for individual yaw of the module, either as an alternative to, or as an addition to, the central yaw system 6. The arm structures are shown to be horizontal, however the arms may be arranged in different orientations, including a configuration where the arms are inclined upwards. Moreover, the structure may be provided with further support structures, including support wires.

Each wind turbine module 2 includes a rotor that is rotatably mounted to a nacelle 8 in the usual way. The rotor has a set of three blades 9 in this embodiment. Three-bladed rotors are a common rotor configuration, but different numbers of blades are also known, including two bladed turbines. Thus, the wind turbine modules 2 are each able to generate power from the flow of wind that passes through the swept area or 'rotor disc' associated with the rotation of the blades.

FIG. 1 illustrates an embodiment with four wind turbine modules 2, where the turbine modules are arranged in two layers. Other configuration of multi-rotor turbines exists, hereunder systems comprising less or more wind turbines modules. One specific example is a multi-rotor system comprising two wind turbine modules arranged in the same layer.

Figure 2:
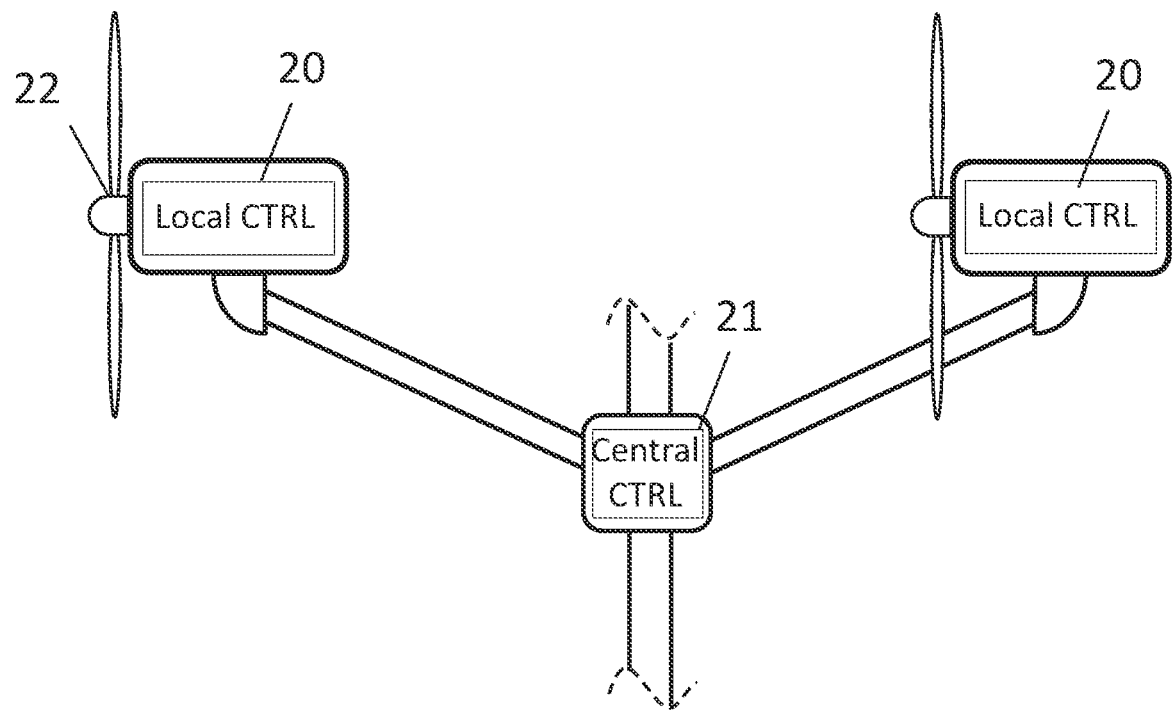
FIG. 2 schematically illustrates an embodiment of a control system together with elements of wind turbine modules.

FIG. 2 schematically illustrates an embodiment of a control system together with elements of wind turbine modules. The figure illustrates local controllers 20 arranged for each wind turbine module, and implementing a local model predictive control (MPC) routine. The local CTRL is illustrated to be placed in the respective wind turbine module, however in general it may be implemented for controlling a given wind turbine module, but physically placed at a different location, or be split into different physical locations. For example, at least part of a local controller may be placed in the tower section. A central controller 21 is arranged to be in communicative connection with each local controller 20. The central controller is illustrated to be placed in the yaw system. However, it may alternatively be placed at a platform located in the tower.

While not illustrated, each wind turbine module is further comprising elements such as an electrical generator mechanically connected to the rotor, either via a gearbox or via a direct drive connection. The electrical power generated by the generator is injected into a power grid via an electrical converter. The electrical generator can be a doubly fed induction generator or a full-scale converter, but other generator types may be used. Moreover, other embodiments exist for the grid connection, such as embodiments where a shared converter is used for all wind turbine modules of the multi-rotor wind turbine. Each wind turbine module may be directly connected to the grid or may be connected via an intermediate connection station.

The control system comprises a number of elements, including processors and memory elements, so that the processor is capable of executing computing tasks based on instructions stored in the memory, as well as performing computing tasks. In general, the local controller ensures that in operation the wind turbine generates a requested power output level as defined by the local control objectives. This is obtained by adjusting the pitch angle and/or the power extraction of the converter. To this end, the local control system 20 comprises or is connected to a pitch system 22 including a pitch controller using a pitch reference, and a power system including a power controller using a power reference. The wind turbine rotor comprises rotor blades that can be pitched by a pitch mechanism. The rotor may comprise a common pitch system which adjusts all pitch angles on all rotor blades at the same time, as well as in addition thereto an individual pitch system which is capable of individual pitching of the rotor blades.

Figure 3:
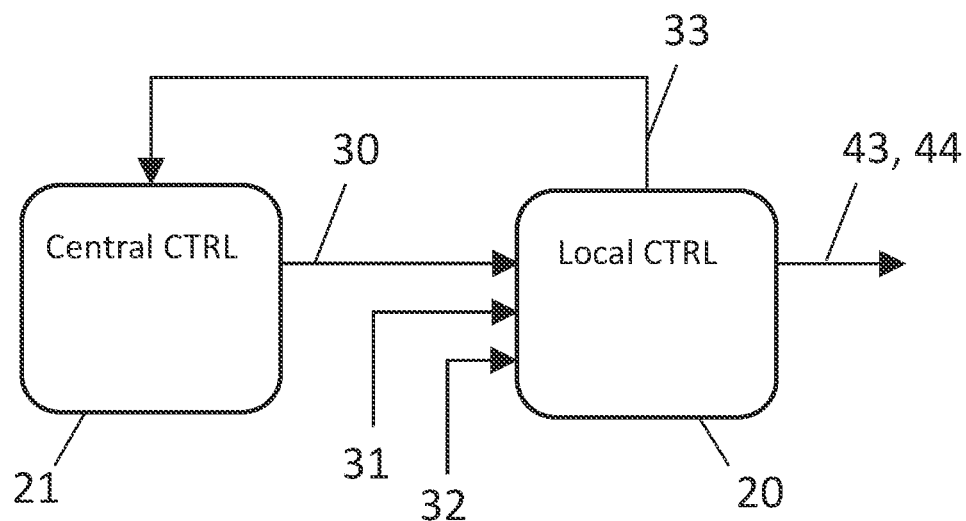
FIG. 3 illustrates a general control scheme in accordance with embodiments of the present invention.

FIG. 3 illustrates a general control scheme in accordance with embodiments of the present invention. The central controller 21 determines a set of operational constraints 30 of the wind turbine modules, which are provided as input to the local controller 20 for use by the local MPC routine. The local MPC routine further receives a current operational state 31 of the wind turbine module. Based on the current operational state 31 and the set of operational constraints 30, one or more predicted operational trajectories 43, 44 are calculated. The one or more predicted operational trajectories include a predicted control trajectory 44. Current or predicted operational conditions of the local controller, e.g. such information as thrust, pitch, deflection state, blade load, etc. of the wind turbine module may be provided 33 to the central controller. The central controller 21 is implemented to determine the set of operational constraints 30.

The local controllers 20 are arranged to calculate the control trajectory for the wind turbine module. To this end, the local controller monitors, or receives monitor signals 31, 32 related to the operation of the wind turbine system. Such monitor signals may e.g. be the various output signals from the various local system elements, however it could also be other signals e.g. directed to sensor signals, actuator signals, set-points, meteorological data, and signals from other wind turbine systems. In general, any signal which can be used for defining the operational state of the wind turbine system. The local controllers 21 is implemented to monitor the operation of the wind turbine module and based on the operation of the wind turbine module calculate such control commands as pitch set-points and speed set-points.

The central controllers may typically be implemented as a control loop feedback controller, i.e. a PI or PID controller or any other controller of such type. In general, the central controller may be implemented to operate any suitable controller type, including as a model predictive controller, as well as including open loop control elements.

Figure 4:
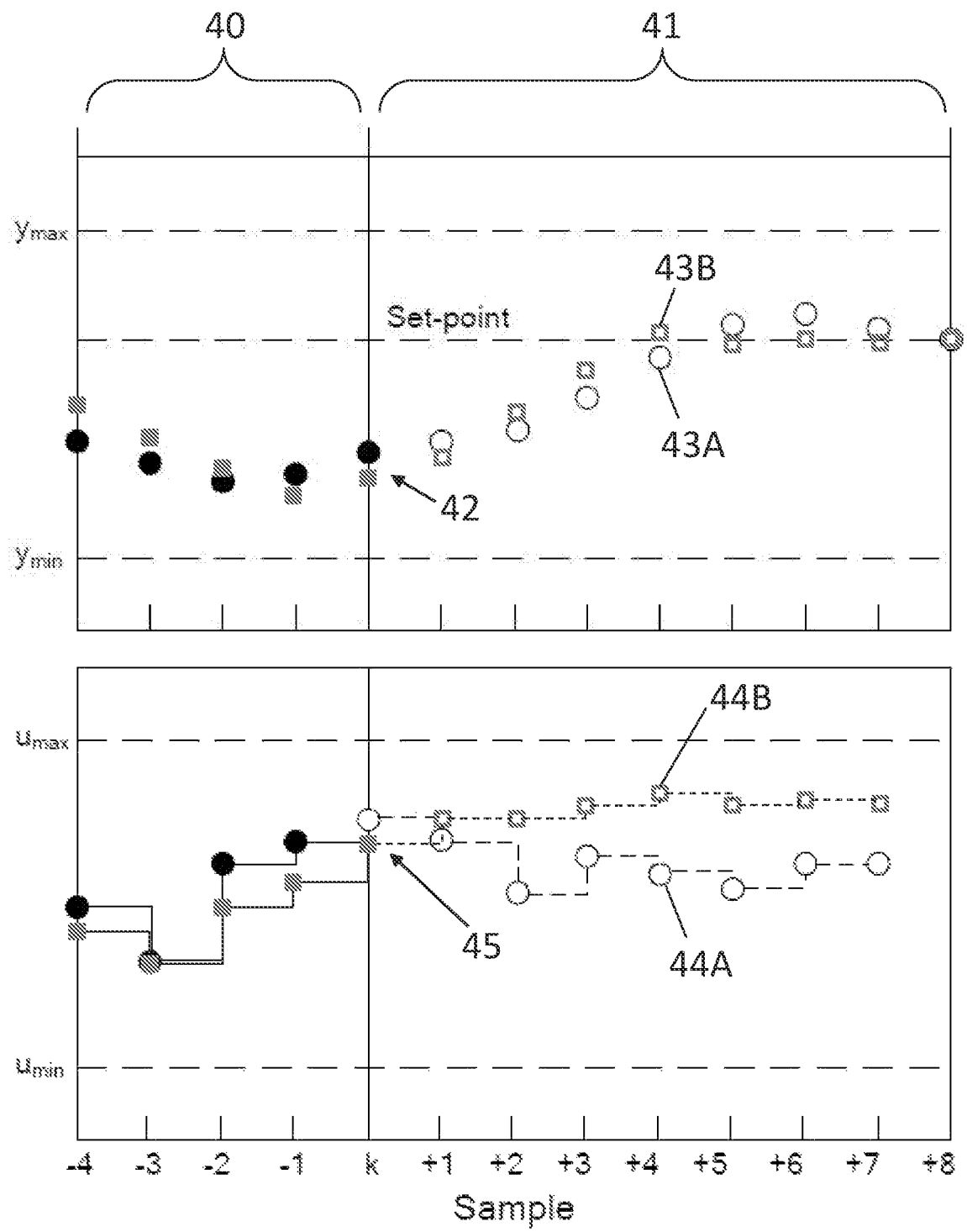
FIG. 4 shows general aspects of MPC routines implemented in two local controllers.

FIG. 4 shows general aspects of MPC routines implemented in two local controllers in relation to the same measured operational variable y and calculated control variable u. The upper part of the figure shows two state trajectories for the variable $y_1$, 43A related to an operational variable of a first wind turbine module, and the variable $y_2$, 43B related to the same operational variable of a second wind turbine module.

In the lower part of FIG. 4 two control trajectories $u_1$, 44A and $w_2$, 44B are shown for the control variable u for the two wind turbine modules. While illustrated on the same graphs, it is noted that the trajectories are determined by different local MPC routines.

The operational trajectories and control trajectories may include, but are not limited to, one or more of the following parameters: pitch value, including collective pitch values and individual pitch values, rotor speed, rotor acceleration, support structure movement, power related parameters, torque related parameters and derivatives of these parameters.

In an embodiment, the operational trajectory is a predicted operational state trajectory. A state is a collection, often expressed as a vector, of operational parameters. An example wind turbine state is:

$$x^* = \begin{bmatrix} \theta(t) \\ \dot{\theta}(t) \\ \omega(t) \\ \dot{\omega}(t) \\ s(t) \\ \dot{s}(t) \\ \ddot{s}(t) \end{bmatrix}$$

comprising pitch value, θ, rotor angular speed, ω, and nacelle position, s, as well as time derivatives of those parameters. Other and more parameters may be used to define the wind turbine state, x*, in particular a number of position sensors, or accelerometers may be used and attached to various parts of the support structure 3. Again, in a multi-rotor modular system, corresponding state vectors exist for each wind turbine module, and while the actual values are specific to the given modules, the set of parameters are typically the same.

The state values of the current operational state of the wind turbine may be based on measured sensor readings from sensors arranged to measure sensor data relating to the wind turbine's physical state values. Additionally, estimated values or calculated values may also be used. In an embodiment, the state may be determined by a state calculator, e.g. in the form of a dedicated computational unit in charge of determining the current operational state, such as an observer or a Kalman filter.

The trajectory may also be expressed as a control trajectory. An example control trajectory may be:

$$u_1^* = \begin{bmatrix} \theta_{ref} \\ P_{ref} \end{bmatrix}$$

comprising the pitch reference signal and the power reference signal for the given wind turbine module local controller. Other and more parameters may be used to define the wind turbine control signal, $u_1^*$. Again, in a multi-rotor modular system, corresponding control trajectories exist for each wind turbine module.

FIG. 4 shows trajectories 43A, 43B of measured variables $y_1$ and $y_2$ for a number of discrete time steps. The figure shows the current time, k, as well as a number of past time steps 40 and a number of future time steps 41 (also sometimes referred to as the prediction horizon and the control horizon for the state variable y and the control variable u, respectively). Known variable values, i.e. based on already measured values, are marked with a solid mark (circle or square), whereas predicted variable values are marked with an open mark. A trajectory may comprise a time series of predicted values, i.e. only the open circles. The trajectories need not include the past and known values, but may do in certain embodiments. In particular, the current values 42, 45 may be included for trajectories of measured variables. The trajectory may span a time series of a few seconds, such as 5-10 seconds. However the trajectory may be longer or shorter depending on the given implementation.

As an example, the y-trajectories show the rotor speed ω in a situation where a set-point is given to increase the rotor speed in each of two wind turbine modules. The trajectory shows the current rotor speed 42 together with the predicted future rotor speeds. Allowed maximum and minimum values are also shown for the illustrated variable. As can be seen the set-point is the same for the two turbine modules, but due to slight differences in the operating conditions, the trajectories are not identical.

FIG. 4 further illustrates an example of general control trajectories determined by use of an MPC algorithm. FIG. 4 illustrates the relationship between an operational state trajectory 43A, 43B and a general control trajectory 44A, 44B. In embodiments, the general control trajectory may be operational trajectories that are calculated using the predicted operational state trajectory.

While the current k-th value 42 is known for measured variables, the current value 45 of the control trajectory is calculated by use of the MPC routine. In one embodiment, the current value of the control trajectory may be used directly as a local control objective.

The figure also shows maximum and minimum allowed values for the control trajectory values of u.

As an example, the trajectories show the trajectory for the pitch angle, i.e. u=θ. Thus a set-point is given to change the rotor speed, and as a consequence the pitch angle is changed.

Model Predictive Control (MPC) is a multivariable control algorithm that uses an optimization cost function J over the receding prediction horizon, to calculate the optimal control moves.

In an embodiment, the cost function of the model predictive control routine comprises elements directed to isolated operation of each of the respective one of the plurality of wind turbines without taking cross-coupling of the operation of another wind turbine module into account. As an example, the optimization cost function for a given wind turbine module may be given by:

$$J = \sum_{i=1}^{N} w_{y_i}(r_i - y_i)^2 + w_{u_i}\Delta u_i^2 \qquad \text{Eq. 1}$$

With reference to FIG. 4, $r_i$ is the set-point for the i-th variable, $y_i$ and $u_i$ being i-th trajectory variables, and $w_{y_i}$ being weight matrix defining the relative importance of this variable, and $w_{u_i}$ being weight matrix defining the penalty related to changes in this variable.

By implementing in the local controller an MPC routine an optimization problem over N time steps (the control and prediction horizon) is solved at each sample time. The result is an optimal input sequence for the entire horizon which may be used for controlling the multi-rotor turbine modules.

In an example embodiment, the optimization problem used for normal production has the form:

$$\bar{u}^*(t) = \text{argmin } J_0(S(t), P(t), \bar{u}(t)),$$

subject to the constraints:

$$\omega_R \leq \Gamma_{\omega_R}$$

$$-5 \leq \theta_b \leq 90, b \in \{1,2,3\}$$

$$-20 \leq \dot{\theta}_b < 20, b \in \{1,2,3\}$$

$$P_E \leq 6\text{MW}$$

The function argmin is the standard mathematical operator which stands for argument of the minimum, and finds points in the parameter space spanned by S, P, u and t where the cost function $J_0$ attains its smallest value. The parameter $\omega_R$ denotes the rotor speed with maximum value $\Gamma_{\omega_R}$, $\theta_i$ the pitch angle (with derivative) and $P_E$ refers to the power of the wind turbine module.

In embodiments, the constraints used in the optimization process can be set based on the current operational state of the wind turbine. For example, should one turbine module stop operation, the power generation for that turbine module may be set to zero. Should a wind turbine module be derated for a specific reason, the derated power level may be set as a constraint.

The nominal cost function $J_0$ provides a trade-off between power (P) and loads (S) using the control signal $\bar{u}(t)$, while the constraints limit the rotor speed, blade pitch angle, blade pitch speed, and electrical power for each of the respective one of the plurality of wind turbine modules. The control signal would typically consist of blade pitch angles and power reference for the converter:

$$\bar{u}(t) = \begin{bmatrix} u_1(t) \\ u_2(t) \\ \vdots \\ u_m(t) \end{bmatrix}, u_i(t) = \begin{bmatrix} \theta_1(t) \\ \theta_2(t) \\ \theta_3(t) \\ P_{ref}(t) \end{bmatrix}.$$

In such an embodiment, at time t the current state is sampled and a cost-minimizing control strategy is computed for a time horizon in the future: [t, t+T], and then the turbine state is sampled again and the calculations are repeated starting from the new current state, yielding a new control trajectory and new predicted state trajectory.

Each local controller thus determines a current operational state of the wind turbine module, and based on the current operational state calculates a predicted operational state trajectory of the wind turbine module. In particular local control objectives may be determined as, or based on, the next control trajectory values 45 (see FIG. 4), possible together with the predicted future values of the predicted horizon.

In this manner it is ensured that each of the wind turbine modules are operated using an optimal trajectory taking into account overall operational targets in the form of constraints.

Figure 5:
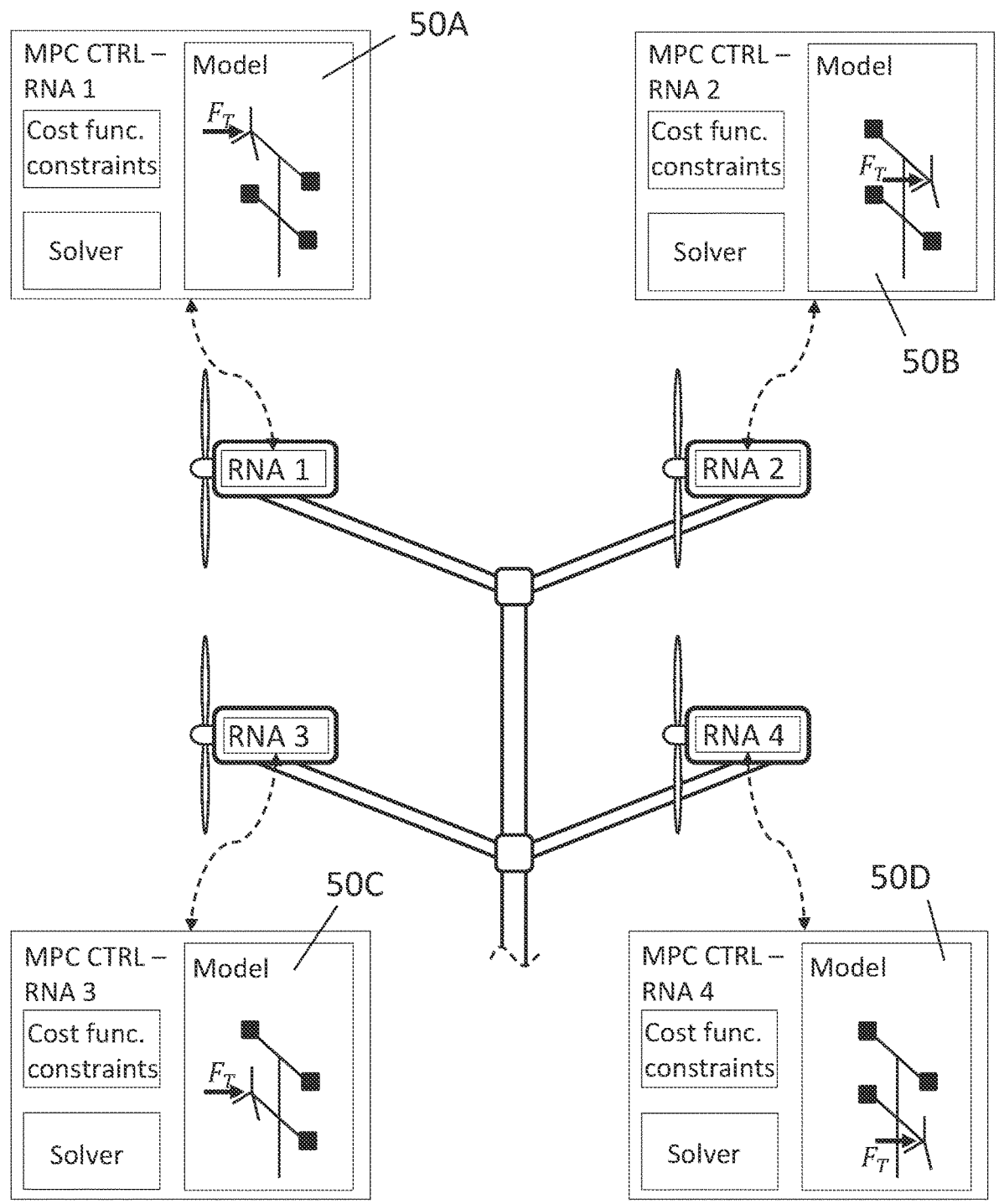
FIG. 5 illustrates an embodiment where the cost function of the local model predictive control routine comprises a structural model.

FIG. 5 illustrates an embodiment where the cost function of the local model predictive control routine comprises a structural model 50A-50D for predicting the motion of the wind turbine module of the local controller. In the figure, reference to the wind turbine module is made as rotor-nacelle assembly (RNA). In the embodiment the structural model includes a structural model of the wind turbine system taking into account an aerodynamic force, $F_T$, applied to the wind turbine module of the local controller without taking into account aerodynamic forces applied to other wind turbine modules of the wind turbine system. Instead the aerodynamic force of the other wind turbine modules is treated in the structural model as unknown disturbances. In an embodiment, detected motion, e.g. from accelerometers, of the other wind turbine modules may be feed into the structural model to improved determination of the proper vibrational mode.

Figure 6:
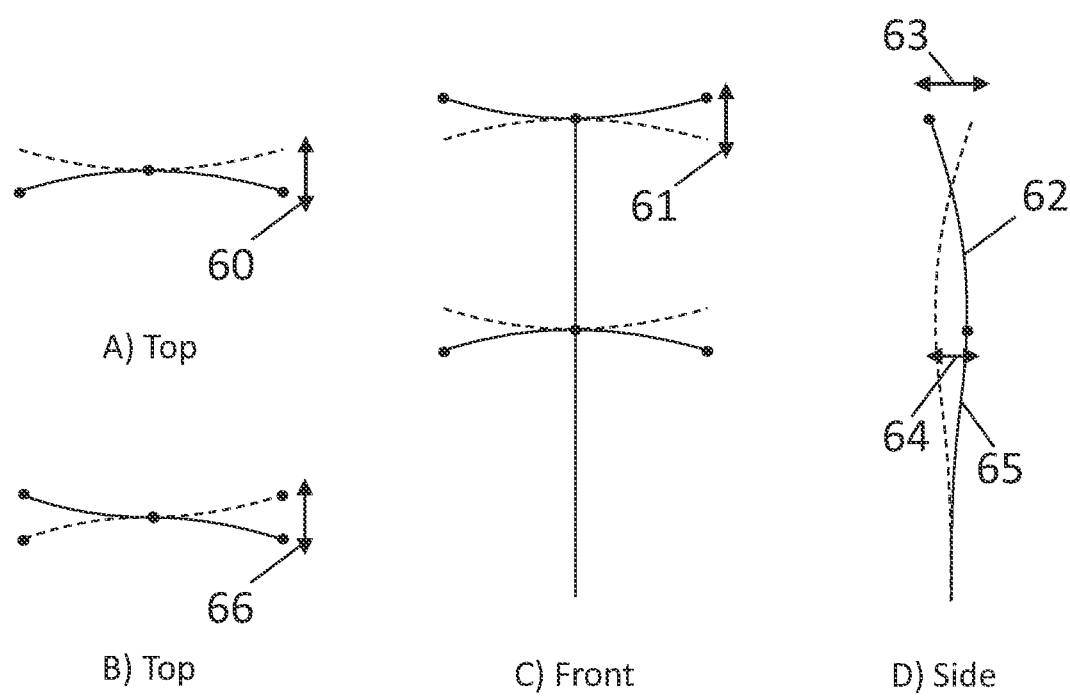
FIG. 6 illustrates examples of selected mode shapes of a schematic multi-rotor wind turbine system.

FIG. 6 illustrates examples of selected mode shapes of a schematic multi-rotor wind turbine system. In embodiments, the structural model is defined by a number of pre-determined mode shapes for the movement of the wind turbine system. The solid lines and the dotted lines showing maximum positions of the movement of the illustrated elements.

FIG. 6A schematically illustrates a top view showing a mode shape where a support arm vibrates in phase in an in-out 60 movement, thereby enabling the structural model for predicting the in-phase fore-aft motion of the wind turbine module of the local controller.

FIG. 6B schematically illustrates a top view showing a mode shape where a support arm vibrates in an anti-phase in-out 66 movement, thereby enabling the structural model for predicting anti-phase fore-aft motion of the wind turbine module of the local controller.

FIG. 6C schematically illustrates a front view showing a mode shape where support arms vibrates in an up-down 61 movement, thereby enabling the structural model for predicting motion in the rotor plane of the wind turbine module of the local controller.

The structural model may include further mode shapes, including mode shapes of tower movement. In FIG. 6D tower fore-aft vibration is schematically illustrated in a side view, in an example mode shape where the top section 62 vibrates with a larger amplitude 63 than the amplitude 64 of the bottom section 65.

A motion equation of the structure can be defined as a dynamic model which link control actions with the vibrational states. For example a motion equation can be defined which models the force vector of a given pitch response and/or rotor speed value or change and the resulting movement of a node point. This can be modelled for each mode shape and a total motion equation can be provided as a superposition of the selected number of mode shapes.

Having defined a motion equation for the structure, cost function elements, $\theta_p(\bar{y}_n, \bar{u}_n)$ of Eq. 1, can be defined which link a given control action at one wind turbine module with the remaining structure.

The complexity of the optimization is dependent upon the number of mode shapes that is included in the motion equation. It may be sufficient to only consider the most important mode shapes.

The number of mode shapes to be selected can be based on a vibrational frequency of the mode shape being less than a frequency limit. It may be sufficient to only include mode shapes having a vibrational low frequency. In this regard it may be sufficient to include mode shapes with a vibrational frequency less than 1 Hz, or even lower, such as less than 0.3 Hz or even less than 0.15 Hz.

Additionally or alternatively to this, the number of mode shapes to be selected can be based on a minimum level of vibrational energy being included in the selected number of mode shapes.

For example the mode shapes which contain at least 60% of the vibrational energy, or even more, such as at least 75% of the vibrational energy.

Additionally or alternatively to this, mode shapes may also be selected based on a structural analysis, so that the mode shapes which incur the most loads on the support structure or elements of the support structure can be selected. Such elements may be the tower, support arms, blades, or other elements. The load may as examples be determined as fatigue loads or maximum loads.

FIG. 6 illustrates example mode shapes. The invention is not limited to these mode shapes. It is within the capabilities of the skilled person to select appropriate mode shapes, the given number of mode shapes to include, as well as the number and nature of the node points used.

Although the present invention has been described in connection with the specified embodiments, it should not be construed as being in any way limited to the presented examples. The invention can be implemented by any suitable means; and the scope of the present invention is to be interpreted in the light of the accompanying claim set. Any reference signs in the claims should not be construed as limiting the scope.

The invention claimed is:

1. A control system for a wind turbine system comprising two or more wind turbine modules mounted to a common support structure, the control system comprises:
   a plurality of local controllers, each respective local controller of the plurality of local controllers arranged for each respective wind turbine module of the two or more wind turbine modules, and each respective local controller implementing a local model predictive control (MPC) routine;
   a central controller being in communicative connection with each local controller, the central controller being arranged to determine a set of operational constraints of the two or more wind turbine modules, the central controller configured as a control loop feedback controller;
   wherein, for a respective local controller of arranged for a respective wind turbine module of the two or more wind turbine modules, the local MPC routine-being is arranged for receiving a current operational state of the respective wind turbine module and, based on the current operational state of the respective wind turbine module and the set of operational constraints, calculating one or more predicted operational trajectories, the one or more predicted operational trajectories include a predicted control trajectory, where a trajectory comprises a time series of at least one variable;
   wherein, for the respective local controller arranged for the respective wind turbine, a cost function of the local MPC routine comprises a structural model configured to predict motion of the respective wind turbine module, the structural model configured to account for an aerodynamic force applied to the respective wind turbine module rather than aerodynamic forces applied to every other wind turbine module of the two or more wind turbine modules, and
   wherein the structural model is configured to treat the aerodynamic forces applied to every other wind turbine module of the two or more wind turbine modules as an unknown disturbance; and
   wherein the respective local controller is configured to control the respective wind turbine module using the predicted control trajectory.

2. The control system according to claim 1, wherein the set of operational constraints comprises a constraint on one or more of the following: a pitch constraint, a blade load constraint, a rotor thrust constraint, an output power constraint and/or a rotor speed constraint.

3. The control system according to claim 1, wherein the set of operational constraints are determined so that a yaw moment imposed on a yaw system arranged at the common support structure is below a yaw moment limit.

4. The control system according to claim 1, wherein the central controller is further arranged to provide timing commands instructing the respective local controller to enter an operational state or change an operational state at a time specified in the timing command.

5. The control system according to claim 1, wherein the central controller is arranged to control a yaw position of a yaw system arranged at the common support structure.

6. The control system according to claim 1, wherein, for the respective local controller, the local MPC routine repeatedly calculates a receding horizon trajectory for the respective wind turbine module and wherein the set of operational constraints is determined based on the receding horizon trajectory for the respective wind turbine module.

7. The control system according to claim 1, wherein the cost function of the local MPC routine comprises elements directed to isolated operation of the respective wind turbine module without taking cross-coupling of operation of another wind turbine module into account.

8. The control system according to claim 1, wherein the structural model is defined by a number of pre-determined mode shapes for a movement of the wind turbine system.

9. The control system according to claim 1, wherein, for the respective local controller, the structural model is arranged for predicting a fore-aft motion of the respective wind turbine module.

10. The control system according to claim 1, wherein, for the respective local controller, the structural model is arranged for predicting the motion in a rotor plane of the respective wind turbine module.

11. A wind turbine system comprising two or more wind turbine modules mounted to a common support structure, wherein each of the two or more wind turbines modules includes a rotor and a power generation system driven by the rotor, wherein the wind turbine system further comprises a control system, the control system comprises:
 a plurality of local controllers, each respective local controller of the plurality of local controllers arranged for each respective wind turbine module of the two or more wind turbine modules, each respective local controller configured to implement a local model predictive control (MPC) routine; and
 a central controller being in communicative connection with each respective local controller, the central controller being arranged to determine a set of operational constraints of the two or more wind turbine modules, the central controller configured as a control loop feedback controller;
 wherein, for a respective local controller arranged for a respective wind turbine module, the local MPC routine is arranged for receiving a current operational state of the respective wind turbine module and, based on the current operational state and the set of operational constraints, calculating one or more predicted operational trajectories, the one or more predicted operational trajectories include a predicted control trajectory, where a trajectory comprises a time series of at least one variable;
 wherein, for the respective local controller arranged for the respective wind turbine, a cost function of the local MPC routine comprises a structural model configured to predict motion of the respective wind turbine module, the structural model configured to account for an aerodynamic force applied to the respective wind turbine module rather than aerodynamic forces applied to every other wind turbine module of the two or more wind turbine modules;
 wherein the structural model is configured to treat the aerodynamic forces applied to every other wind turbine module of the two or more wind turbine modules as an unknown disturbance; and
 wherein the respective local controller is configured to control the respective wind turbine module using the predicted control trajectory.

12. A method of controlling a wind turbine system comprising two or more wind turbine modules mounted to a common support structure, the method comprising:
 determining in a central controller, a set of operational constraints of the two or more wind turbine modules, the central controller configured as a control loop feedback controller;
 receiving a current operational state of each of the two or more wind turbine modules;
 calculating in a local controller arranged for a respective wind turbine module of the two or more wind turbine modules, using a model predictive control (MPC) routine, and based on the current operational state of the respective wind turbine module and the set of operational constraints, one or more predicted operational trajectories, the one or more predicted operational trajectories comprising a predicted control trajectory, where a trajectory comprises a time series of at least one variable;
 wherein a cost function of the MPC routine comprises a structural model configured to predict motion of the respective wind turbine module, the structural model configured to account for an aerodynamic force applied to the respective wind turbine module rather than aerodynamic forces applied to every other wind turbine module of the two or more wind turbine modules;
 wherein the structural model is configured to treat the aerodynamic forces applied to every other wind turbine module of the two or more wind turbine modules as an unknown disturbance; and
 controlling the respective wind turbine module using the predicted control trajectory.

13. A non-transitory computer readable medium comprising instructions to be executed in a processing system to control a wind turbine system comprising two or more wind turbine modules mounted to a common support structure when executed on a data processing system, the instructions, when executed, cause the processing system to perform an operation, comprising:
 determining in a central controller, a set of operational constraints of the wind turbine modules, the central controller configured as a control loop feedback controller;
 receiving a current operational state of each of the two or more wind turbine modules;
 calculating in a local controller arranged for a respective wind turbine module of the two or more wind turbine modules, using a model predictive control (MPC) routine, and based on the current operational state of the respective wind turbine module and the set of operational constraints, one or more predicted operational trajectories, the one or more predicted operational trajectories comprising a predicted control trajectory, where a trajectory comprises a time series of at least one variable;
 wherein a cost function of the MPC routine comprises a structural model configured to predict motion of the respective wind turbine module, the structural model configured to account for an aerodynamic force applied to the respective wind turbine module without taking into account aerodynamic forces applied to every other wind turbine module of the two or more wind turbine modules;
 wherein the structural model is configured to treat the aerodynamic forces applied to every other wind turbine module of the two or more wind turbine modules as an unknown disturbance; and
 controlling the wind turbine module using the predicted control trajectory.

* * * * *